United States Patent
Gaul et al.

(10) Patent No.: US 11,644,340 B2
(45) Date of Patent: May 9, 2023

(54) AUTOMATED AVIONICS SYSTEMS AND METHODS FOR DETERMINING A MODIFIED PATH OF DESCENT OF AN AIRCRAFT

(71) Applicant: Garmin International, Inc., Olathe, KS (US)

(72) Inventors: Robert W. Gaul, Olathe, KS (US); Joseph R. Lombardo, Olathe, KS (US); Caleb J. Gorman, Roeland Park, KS (US)

(73) Assignee: Garmin International, Inc., Olathe, KS (US)

( * ) Notice: Subject to any disclaimer, the term of this patent is extended or adjusted under 35 U.S.C. 154(b) by 98 days.

(21) Appl. No.: 17/140,833

(22) Filed: Jan. 4, 2021

(65) Prior Publication Data

US 2022/0214190 A1 Jul. 7, 2022

(51) Int. Cl.
*G01C 23/00* (2006.01)
*B64D 43/00* (2006.01)
*G05D 1/10* (2006.01)

(52) U.S. Cl.
CPC ............ *G01C 23/005* (2013.01); *B64D 43/00* (2013.01); *G05D 1/101* (2013.01)

(58) Field of Classification Search
USPC ........................................................ 701/457
See application file for complete search history.

(56) References Cited

U.S. PATENT DOCUMENTS

| | | | |
|---|---|---|---|
| 4,709,336 A | 11/1987 | Zweifel | |
| 6,720,891 B2 | 4/2004 | Chen et al. | |
| 8,014,907 B2 | 9/2011 | Coulmeau | |
| 8,812,180 B2 | 8/2014 | Wachenheim et al. | |
| 10,109,202 B2 | 10/2018 | Boulle et al. | |
| 2011/0208374 A1* | 8/2011 | Jayathirtha | G01C 23/005 701/4 |
| 2013/0030611 A1 | 1/2013 | Constans et al. | |
| 2014/0012436 A1 | 1/2014 | Coulmeau et al. | |
| 2016/0275800 A1* | 9/2016 | Boulle | G05D 1/0638 |
| 2017/0323573 A1* | 11/2017 | Decker | G08G 5/0047 |
| 2018/0370645 A1* | 12/2018 | Durand | G05D 1/0676 |
| 2019/0005827 A1* | 1/2019 | Bauer | G08G 5/0039 |

* cited by examiner

*Primary Examiner* — Maceeh Anwari
(74) *Attorney, Agent, or Firm* — Samuel M. Korte; Max M. Ali

(57) ABSTRACT

An automated avionics system for determining a modified descent path of an aircraft includes a memory operable to store a database of flight information related to a flight plan and a processor operably coupled with the memory. The processor is operable to receive an indication to initiate descent of the aircraft associated with a position of the aircraft, receive information related to the flight plan from the database, and based on the information received, perform modifications to the path of descent. The processor is further operable to, based on a comparison of an original position of descent and the indicated position, determine a modified position of descent for the aircraft and calculate a modified path of descent, the modified path of descent complying with the of altitude constraint(s) of the flight plan.

10 Claims, 15 Drawing Sheets

AUTOMATED AVIONICS SYSTEMS AND METHODS FOR DETERMINING A MODIFIED PATH OF DESCENT OF AN AIRCRAFT

BACKGROUND

Automated avionics systems replace mechanical and electro-mechanical instrument gauges and controls historically used in aircraft with one or more electronic displays for displaying primary flight information such as attitude, altitude, heading, vertical speed, and so forth, to the pilot, and/or receiving command inputs from the pilot for controlling aircraft systems. Automated avionics systems may include one or more primary flight displays (PFD) and one or more multifunction displays (MFD). Further, automated avionics systems may provide one or more controllers, such as one or more avionics control and display units (CDU), which may provide a user interface (e.g., a touch interface) to allow the aircraft's flight crew (e.g., a pilot and/or a co-pilot) to control the operation of the aircraft via the PFD and/or the MFD and to view navigation information related to the route the aircraft is traversing. Integrated avionics systems also allow the flight crew to manually control operation of the aircraft's systems via the PFD, the MFD, or other controls.

DRAWINGS

The Detailed Description is described with reference to the accompanying figures. The use of the same reference numbers in different instances in the description and the figures may indicate similar or identical items.

DETAILED DESCRIPTION

Figure 1:
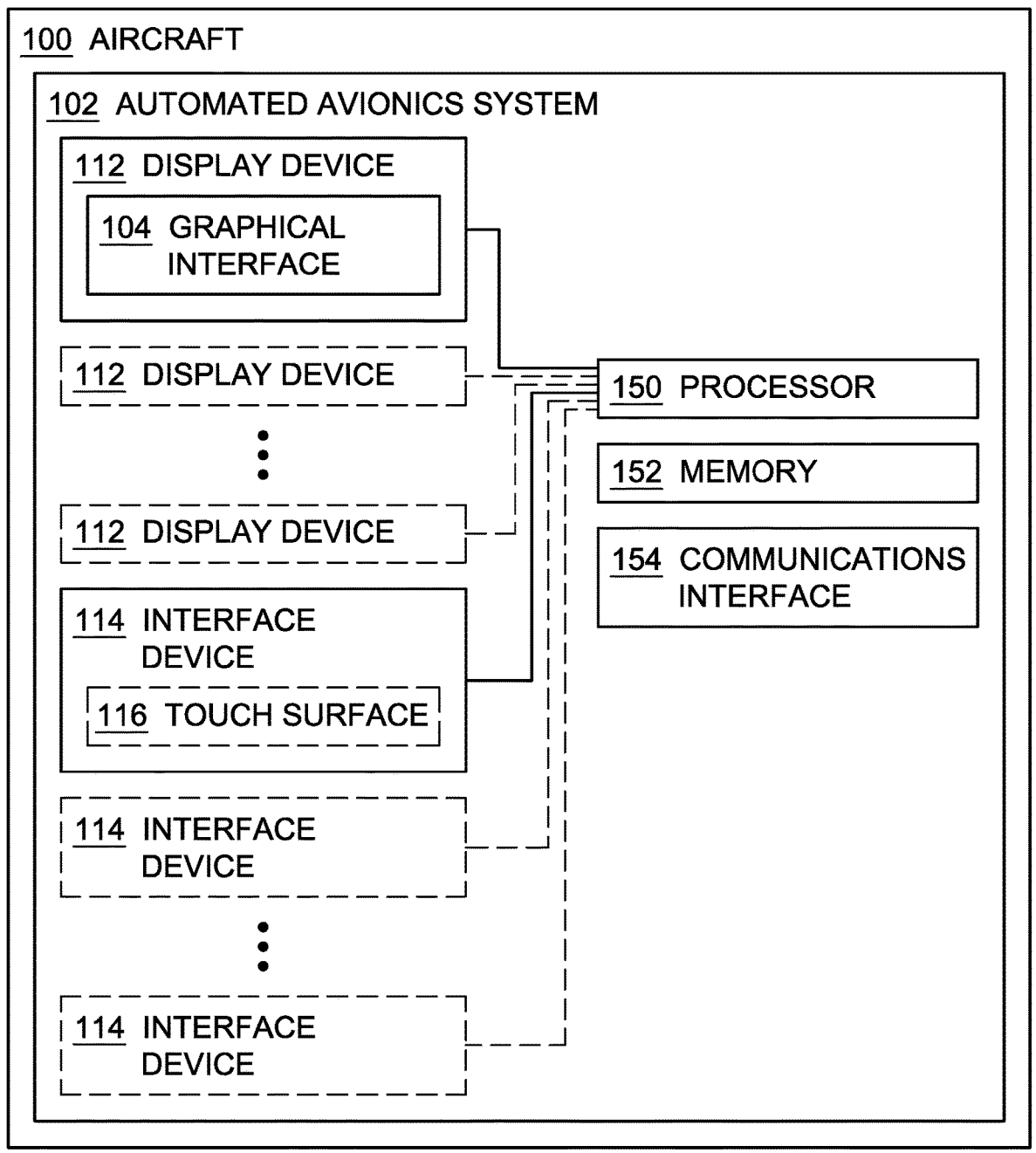
FIG. 1 is a block diagram illustrating an automated avionics system for an aircraft in accordance with embodiments of the present disclosure.

An automated avionics system can include electronic devices, such as integrated avionics systems, which are utilized by one or more aircraft operators (e.g., a pilot and/or a co-pilot) to navigate an aircraft. Integrated avionics systems may employ primary flight display(s) (PFDs) and multifunction display(s) (MFDs) to furnish primary flight control, navigational, and other information to the flight crew of the aircraft. Additionally, the integrated avionics systems may also employ an avionics control and display unit (CDU) and/or other control devices that are configured to provide control functionality to the PFDs and/or the MFDs.

While automated avionics systems may provide the functionality flight crew and/or autopilot navigation of the aircraft (e.g., according to a predefined flight plan), these systems lack the ability to account for deviations from the flight plan without substantial pilot intervention. Under certain circumstances, it may be desirable to initiate descent of the aircraft prior to or after a predetermined top of descent point (TOD) associated with the flight plan, requiring a deviation from the original descent trajectory. For example, the pilot may receive authorization to initiate descent of the aircraft prior to reaching the TOD. In other circumstances, the pilot may reach or pass the TOD without receiving authorization to initiate descent. Under such circumstances, it may be desirable to initiate descent of the aircraft at a desired geographic location and/or altitude other than the TOD, while maintaining and/or accounting for aspects of the flight plan. For example, altering the TOD may necessitate accounting for one or more constraints (e.g., altitude constraints) associated with the flight plan, connecting with the original descent trajectory at a specified altitude constraint, and/or descending at an operator-selected rate of speed. There is a recognized need to provide functionality for determining a descent trajectory based on a revised TOD and accounting for one or more of these variables.

Accordingly, automated avionics systems and methods for determining a modified path of descent for an aircraft are described. In an embodiment, an automated avionics system includes a display device for providing a graphical interface for displaying flight-related information to a pilot, and an interface device disposed on the display device for receiving information from the pilot and allowing the pilot to interact with the graphical interface. The system further includes a memory operable to store a database related to a flight plan, the database including information related to the flight plan such as a position of descent for the aircraft, altitude constraint(s), and a path of descent including a vertical trajectory between the first position of descent and a downstream altitude point. The system further includes a processor communicatively coupled with the interface device and operatively coupled with the display device and the memory. The processor is operable to receive, from the interface device, an indication to initiate descent of the aircraft associated with a position of the aircraft, receive information related to the flight plan from the database, and perform modification(s) to the path of descent. Performing the modification(s) to the path of descent includes determining, based on a comparison of the first position of descent and the position of the aircraft, a deviation between the position of descent and the position of the aircraft, and based on the determination of a deviation from the position of descent, calculating a second position of descent based on the position of the aircraft. The processor is further operable to calculate a second path of descent based on the second position of descent and the downstream altitude point, the second path of descent including a vertical trajectory between the second position of descent and the downstream altitude point, the second path of descent complying with the altitude constraint(s) of the flight plan. In some embodiments, calculating the second path of descent includes determining, by whether the second path of descent complies with the altitude constraint(s); and when the second path of descent violates one or more of the altitude constraints, recalculating the second path of descent so that the vertical trajectory between the second position of descent and the downstream altitude point complies with the violated altitude constraints. The processor may be further operable to cause the display device to display the second path of descent to the pilot and/or send an indication to the pilot to cause the aircraft to initiate the second path of descent. The processor can be further operable to actuate the engine(s) and/or control column(s) of the aircraft to initiate descent.

Example Embodiments

Figure 2:
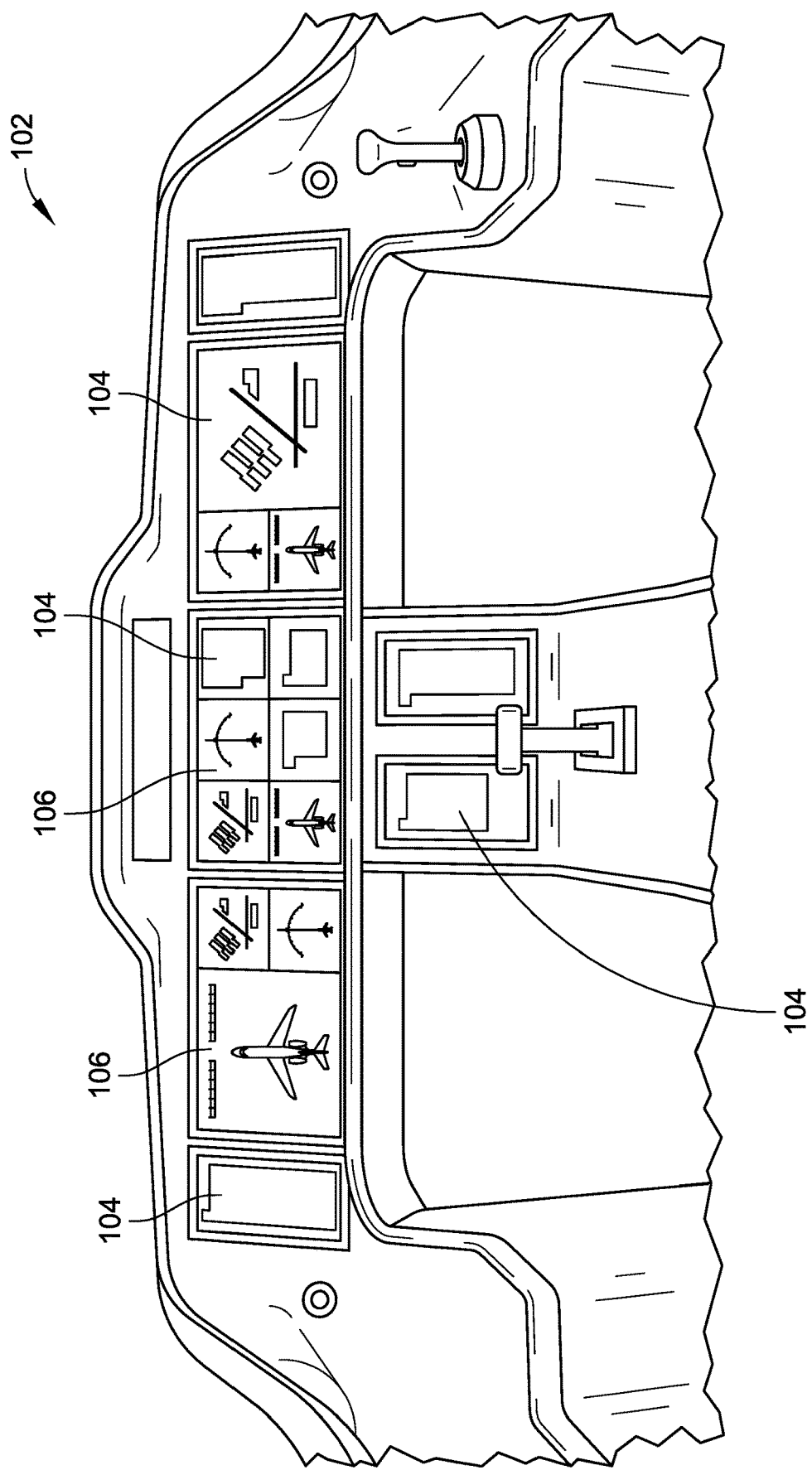
FIG. 2 is an illustration depicting a representative example instrument panel of an aircraft including an automated avionics system configured in accordance with various implementations of the present disclosure.

FIGS. 1 and 2 illustrate an example embodiment of an automated avionics system (e.g., integrated avionics system 102) within an aircraft 100. The integrated avionics system 102 generally includes an interface having a graphical interface 104, a processor 150, a memory 152, a communications interface 154.

The processor 150 provides functionality to the graphical interface 104. For example, the processor 150 can be operably and/or communicatively coupled with the graphical interface 104. The processor 150 can control the components and functions of the system 102 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the system 102. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The processor 150 provides processing functionality for the system 102 and can include any number of processors, micro-controllers, or other processing systems, and resident or external memory for storing data and other information accessed or generated by the system 102. The processor 150 can execute one or more software programs that implement techniques described herein. The processor 150 is not limited by the materials from which it is formed or the processing mechanisms employed therein and, as such, can be implemented via semiconductor(s) and/or transistors (e.g., using electronic integrated circuit (IC) components), and so forth.

The system 102 includes a display device 112 and an interface device 114 that allows a pilot to provide input. In some embodiments, the interface device 114 is a touch screen interface, such as an electronic visual display that incorporates a touch panel overlying an electronic display to detect the presence and/or location of a touch within the display area of the screen. In these embodiments, the pilot can provide input using an instrument such as a finger, a stylus, and so forth. In some embodiments, the interface device 114 allows the pilot to provide to provide non-touch input via one or more keyboards, cursors, buttons, knobs, dials, control columns, and so forth.

The display device 112 can include an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as graphical interface 104 on a display screen. The display device 112 can be backlit via a backlight such that it can be viewed in the dark or other low-light environments. In some embodiments, the display device 112 can be disposed on an instrument panel of the aircraft, a pedestal area of the aircraft, an outboard area of the aircraft, and so forth. In embodiments, the integrated avionics system 102 can include one or more display devices 112 providing differing functionality including, but not limited to: PFD(s), MFD(s), head up display(s) (HUDs), secondary display unit(s) (SDUs) and so forth. In some embodiments, the system 102 includes multiple display devices 112 and corresponding graphical interfaces 104. The display device(s) 112 may furnish a general-purpose pilot interface to control the aircraft's avionics. For example, the display devices 112 allow the pilots to control various systems of the aircraft such as the aircraft's autopilot system, navigation systems, communication systems, engines, and so on, via the avionics data bus. In implementations, the avionics data bus may include a high-speed data bus (HSDB), such as data bus complying with ARINC 429 data bus standard promulgated by the Airlines Electronic Engineering Committee (AEEC), a MIL-STD-1553 compliant data bus, and so forth.

The interface device 114 can be coordinated with the display device 112 for entry of data and commands. In embodiments including a touch interface device, the operator may use his or her fingers to manipulate images on the display device 112. The interface device 114 can be disposed on the display device 112, external to the display device 112, or a combination thereof. In some embodiments, the display device 112 is operable by a combination of direct touch received at the display device 112 and input received external to the display device 112.

In embodiments including a touch interface device, the interface device 114 includes a touch surface 116. For example, the touch surface 116 can be a resistive touch screen, a surface acoustic wave touch screen, a capacitive touch screen, an infrared touch screen, optical imaging touch screens, dispersive signal touch screens, acoustic pulse recognition touch screens, combinations thereof, and the like. Capacitive touch screens can include surface capacitance touch screens, projected capacitance touch screens, mutual capacitance touch screens, and self-capacitance touch screens. In implementations, the touch surface 116 is configured with hardware to generate a signal to send to a processor and/or driver upon detection of touch information (e.g., a touch input). As indicated herein, touch inputs include inputs, gestures, and movements where the input contacts the touch surface 116. In embodiments, the interface device 114 can receive touch information from an operator (e.g., user such as a pilot and/or a co-pilot) to interact with the graphical interface 104 displayed on the display screen. In some embodiments, the graphical interface 104 may include both active portions (e.g., areas that are responsive to operator touch information) and non-active portions (e.g., areas that are not responsive to operator touch information). In implementations, keyboards, cursors, buttons, softkeys, keypads, knobs and so forth, may be used for entry of data and commands instead of or in addition to the touch surfaces 116.

In embodiments, the graphical interface 104 is configured for displaying flight information (e.g., interactive flight-related information 106). In some embodiments, the flight information includes information related to the flight plan of an aircraft (e.g., a vertical trajectory, constraints, etc.) as described below. In some embodiments, the interactive flight-related information 106 is displayed in one or more primary flight windows (PFWs), one or more multifunction windows (MFWs), or a combination thereof. The PFWs may be configured to display primary flight information, such as aircraft attitude, altitude, heading, vertical speed, and so forth. In embodiments, the PFWs may display primary flight information via a graphical representation of basic flight instruments such as an attitude indicator, an airspeed indicator, an altimeter, a heading indicator, a course deviation indicator, and so forth. The PFWs may also display other flight-related information providing situational awareness to the pilot such as terrain information, ground proximity warning information, weather information, and so forth.

In embodiments, The MFWs display interactive flight-related information 106 describing operation of the aircraft such as navigation routes, moving maps, engine gauges, weather radar, terrain alerting and warning system (TAWS) displays, ground proximity warning system (GPWS) displays, traffic collision avoidance system (TCAS) displays, airport information, and so forth, that are received from a variety of aircraft systems via the avionics data bus and/or are self-contained within the display device 112. In some embodiments, the PFW may provide the functionality of an MFW. Where the system 102 includes multiple MFWs, MFWs that control a common systemwide value/state can be cross-filled when multiple instances viewing this value are active substantially simultaneously. Further, the display device 112 may be capable of displaying multiple instances of the same application in multiple MFWs, for example, with no restrictions on the number of the same application that could be displayed substantially simultaneously. In some embodiments, MFWs and/or PFWs shall support display and/or control of third-party applications (e.g., video, hosted applications, ARINC 661, etc.).

The system 102 further includes a communications interface 154. The communications interface 154 is operatively configured to communicate with components of the system 102. For example, the communications interface 154 can be configured to transmit data for storage in the system 102, retrieve data from storage in the system 102, and so forth. The communications interface 154 is also communicatively coupled with the processor 150 to facilitate data transfer between components of the system 102 and the processor 150 (e.g., for communicating inputs to the processor 150 received from a device communicatively coupled with the system 102). It should be noted that while the communications interface 154 is described as a component of a system 102, one or more components of the communications interface 154 can be implemented as external components communicatively coupled to the system 102 via a wired and/or wireless connection. The system 102 can also include and/or connect to one or more input/output (I/O) devices (e.g., via the communications interface 154), including, but not necessarily limited to: a display, a mouse, a touchpad, a keyboard, and so on.

The communications interface 154 and/or the processor 150 can be configured to communicate with a variety of different networks, including, but not necessarily limited to: ARINC 429; RS-232; RS-422; CAN Bus; ARINC 661; a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 154 can be configured to communicate with a single network or multiple networks across different access points.

The memory 152 is an example of tangible, computer-readable storage medium that provides storage functionality to store various data associated with operation of the system 102, such as software programs and/or code segments, or other data to instruct the processor 150, and possibly other components of the system 102, to perform the functionality described herein. Thus, the memory 152 can store data, such as a program of instructions for operating the system 102 (including its components), and so forth. It should be noted that while a single memory 152 is described, a wide variety of types and combinations of memory (e.g., tangible, non-transitory memory) can be employed. The memory 152 can be integral with the processor 150, can include stand-alone memory, or can be a combination of both.

The memory 152 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the system 102 and/or the memory 152 can include removable integrated circuit card (ICC) memory, such as memory provided by a subscriber identity module (SIM) card, a universal subscriber identity module (USIM) card, a universal integrated circuit card (UICC), and so on. In embodiments, the memory 152 includes one or more software modules capable of being executed by the processor 150, and one or more data sets and/or databases.

In embodiments, the memory 152 is operable to store a database of flight-related information associated with a flight plan of the aircraft. Flight-related information associated with the flight plan can include: a position of descent for the aircraft (also noted as top of descent or TOD), geographical constraints, and a path of descent including a vertical trajectory between the first position of descent and a downstream geographical point (e.g. a downstream altitude point). The geographical constraints include passage points for the aircraft in a horizontal plane, with which are associated possible constraints (e.g., altitude constraints, speed constraints, time constraints, etc.). In a specific embodiment, the altitude constraints each define an altitude above, below, or at which the aircraft has to fly at a given point. Each altitude constraint is thus associated with a constrain point above ("ABOVE constraint"), below ("BELOW constraint"), between ("BETWEEN constraint"), or through ("AT constraint") which the aircraft 100 must pass. In specific embodiments, the downstream altitude point is an AT constraint, a Final Approach Fix ("FAF"), or a waypoint.

It is to be understood that flight-related information associated with the flight plan can be obtained from a variety of sources including, but not limited to: pilot input, data received from other aircraft systems, data received from aircraft instrumentation, and so forth. In specific embodiments, one or more types of flight-related information are calculated by the system 102 and storable in memory 152. For example, the processor 150 is operable to determine the TOD and/or path of descent based on other flight-related information (e.g., altitude constraints, waypoints, path types, latitude/longitude positions, etc.).

In embodiments, the processor 150 is operable to interface with the memory 152 to determine a modified (e.g., new or revised) path of descent for the aircraft 100. In embodiments, the processor 150 is operable to determine a new path of descent for the aircraft 100 based on a modified TOD. For example, the processor 150 can initiate descent of the aircraft 100 upstream or downstream of the original TOD of the flight plan based on an indication received from the interface device 114. In some embodiments, the processor 150 receives from the interface device 114, an indication to initiate descent of the aircraft 100 ("descent indication") at a real-time geographical position associated with the aircraft 100, for example, at a current position or a downstream position of the aircraft 100. It is to be understood that while modifying the path of descent by determining a new path of descent is described herein, modifying the path of descent can also include revising the original path of descent, for example by modifying one or more portions of the original path of descent while retaining other portions.

Referring now to FIGS. 3 through 11, example paths of descent 160 and modified paths of descent 162 for an aircraft 100 are shown. In FIGS. 3 through 11, the vertical axis indicates the altitude of the aircraft 100 relative to a reference altitude, and the horizontal axis designates a curvilinear abscissa of the aircraft 100 in a horizontal plane. The illustrated trajectories therefore represent the successive altitudes of the aircraft 100 during a movement of the aircraft 100.

Figure 3:
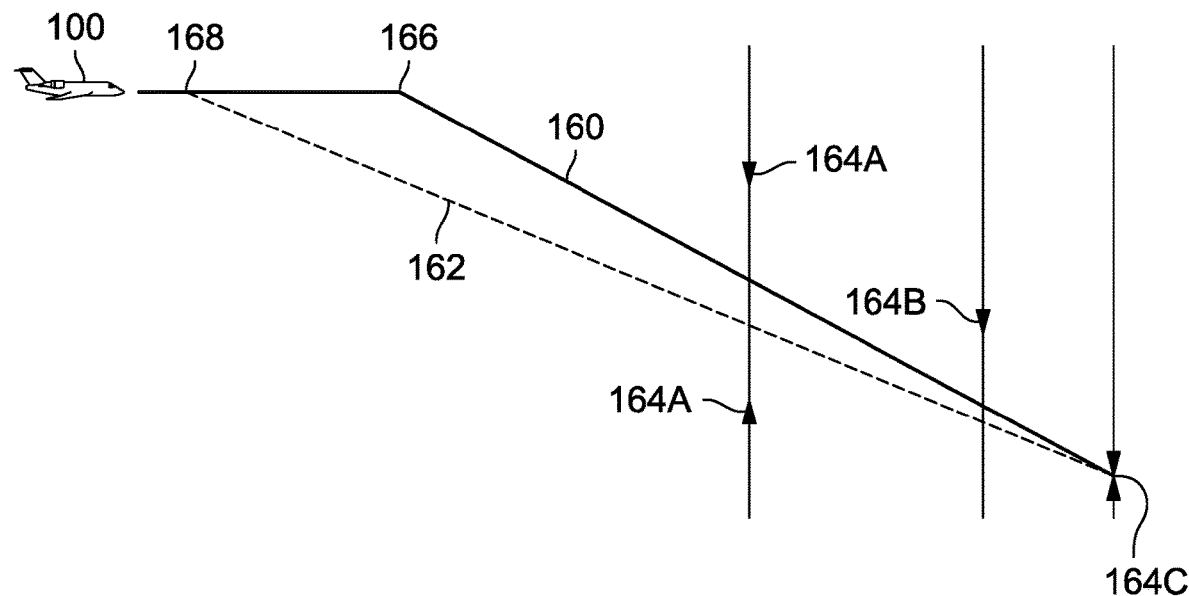
FIG. 3 is a schematic view illustrating an exemplary system for determining a modified path of descent for an automated avionics system, such as the automated avionics system illustrated in FIG. 1, in accordance with embodiments of the present disclosure.

Referring now to FIG. 3, the processor 150 is operable to interface with the memory 152 to determine a modified path of descent 162 for the aircraft 100 that complies with one or more constraints of the flight plan. In some embodiments, the processor 150 is operable to determine a modified path of descent for the constraints corresponding to altitude constraints of the flight plan, which must be observed by the aircraft 100 during its descent, as illustrated in FIG. 3. Example constraints include one or more BETWEEN constraint 164A defining a maximum altitude and a minimum altitude that the aircraft 100 must pass between in a given passage point in the horizontal plane, one or more BELOW constraint 164B defining a maximum altitude in another passage point in the horizontal plane, and one or more AT constraint 164C defining an imposed altitude of the aircraft 100 in a passage point in the horizontal plane. In some implementations, the flight plan further includes one or more ABOVE constraint 164D defining a minimum altitude of the aircraft 100 in a passage point in the horizontal plan (e.g., as described with reference to FIG. 4)

In some implementations, the processor 150 is operable to interface with the memory 152 to determine whether a deviation is present between the original TOD 166 and the position of the aircraft associated with the descent indication. For example, the processor 150 can detect a deviation, greater than a predetermined deviation threshold, between the altitude of the aircraft in the indicated point in the horizontal plane and the altitude in this given point as provided by the original descent trajectory. This deviation threshold corresponds to a tolerance margin between the altitude of the aircraft at the indicated point and the altitude provided by the original descent trajectory.

In some implementations, the processor 150 is operable to interface with the memory 152 to determine a modified path of descent 162 for the aircraft 100 based on a descent indication including a position of the aircraft 100 that is upstream from the original TOD 166 of the flight plan (e.g., as described with reference to FIGS. 3 through 6). In such implementations, the processor 150 determines a modified position of descent (e.g., modified TOD 168) based on the real-time position of the aircraft 100 and/or a downstream altitude position of the aircraft 100, the modified TOD 168 being upstream from the original TOD 166. In some embodiments, the modified TOD 168 corresponds directly to the indicated position of descent. In other embodiments, the TOD 168 may include a position downstream from the indicated position of descent or the real-time position of the aircraft to provide an adequate transition between the level flight phase and the descent phase. The processor 150 then calculates a modified path of descent 162 including a vertical trajectory between the modified position of descent 168 and next downstream AT constraint 164C in the horizontal plane.

Figure 4:
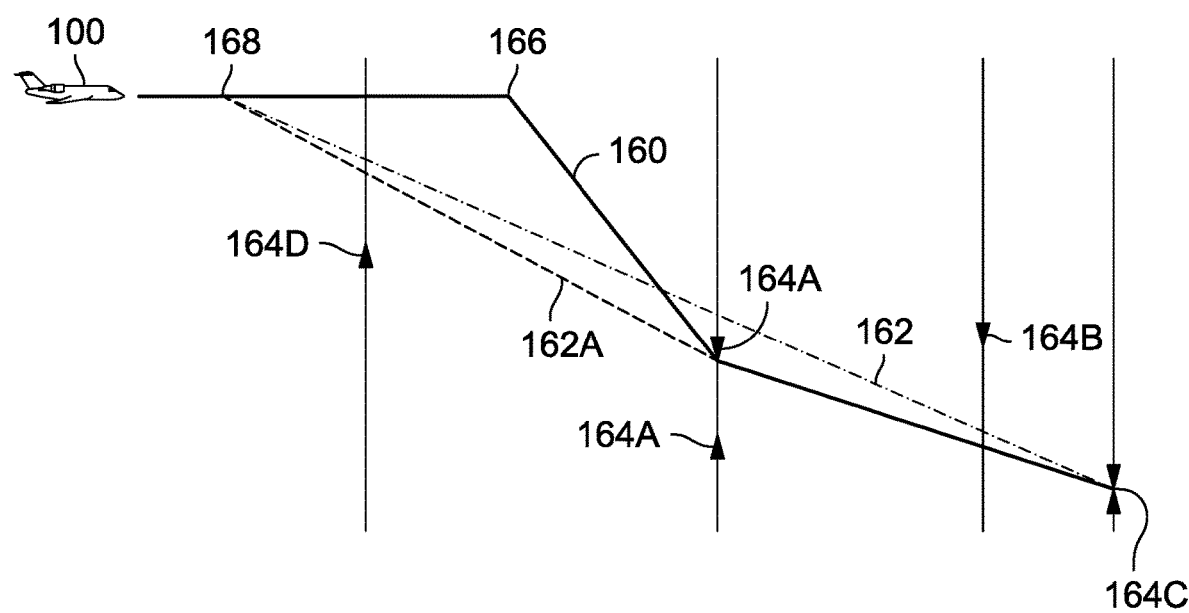
FIG. 4 is a schematic view illustrating another exemplary system for determining a modified path of descent for an automated avionics system, such as the automated avionics system illustrated in FIG. 1, in accordance with embodiments of the present disclosure.

Referring now to FIG. 4, the modified path of descent 162 may violate one or more constraints of the flight plan. In such implementations, the processor 150 is operable to recalculate the modified path of descent 162 so that the vertical trajectory complies with all downstream constraints. The processor 150 determines a recalculated path of descent 162A by determining a vertical trajectory between the modified TOD 168 and the furthest reachable constraint that matches the constraint crossing type of the first constraint violated by the modified path of descent without violating any intermediate constraints. For example, the processor 150 can calculate a vertical trajectory between the modified TOD 168 and the BETWEEN constraint 164A without violating the intermediate ABOVE constraint 164D. In such embodiments, the original descent path 160 is joined beyond the furthest reachable constraint. For example, the processor 150 can calculate a vertical trajectory between the furthest reachable constraint (e.g., BETWEEN constraint 164A) and the AT constraint 164C without violating the intermediate BELOW constraint 164B. In some implementations, the processor 150 treats the furthest reachable constraint as an AT constraint to optimize the recalculated path of descent 162A. For example, the processor 150 can calculate a vertical trajectory between the modified TOD 168 and the maximum altitude associated with the BETWEEN constraint 164A. By determining the recalculated path of descent 162A based on the furthest reachable constraint, the processor 150 provides a recalculated path of descent 162A that rejoins the original descent path 160 while minimizing fluctuations in flight path angle. Treating the furthest reachable constraint as an AT constraint further reduces fluctuations in the flight path angle and/or slope of descent path.

Figure 5:
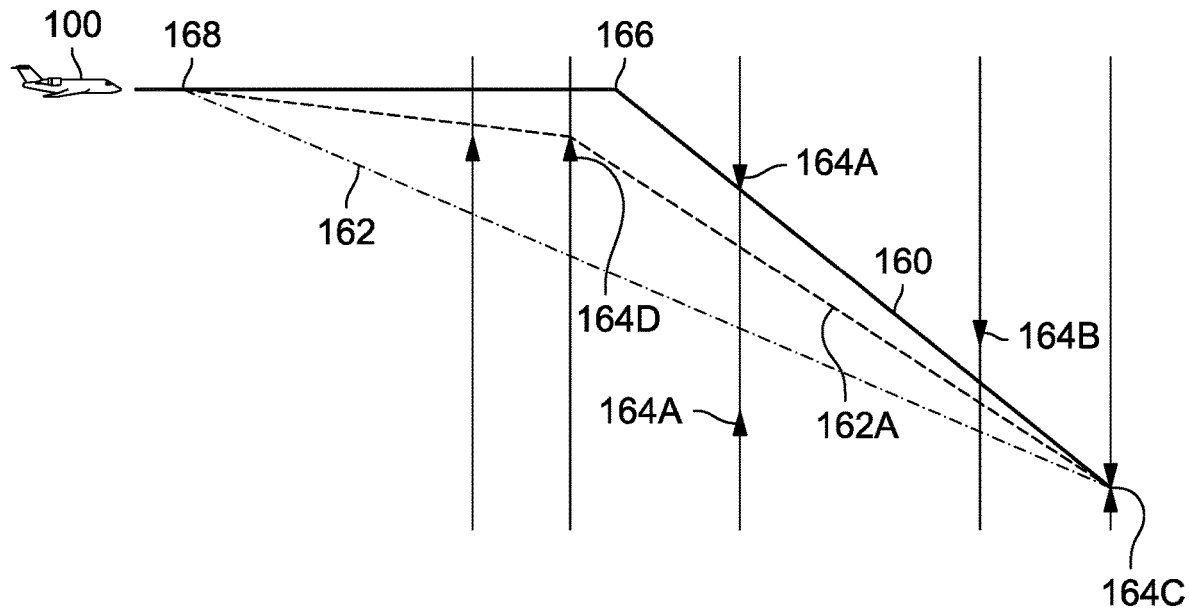
FIG. 5 is a schematic view illustrating another exemplary system for determining a modified path of descent for an automated avionics system, such as the automated avionics system illustrated in FIG. 1, in accordance with embodiments of the present disclosure.
Figure 6:
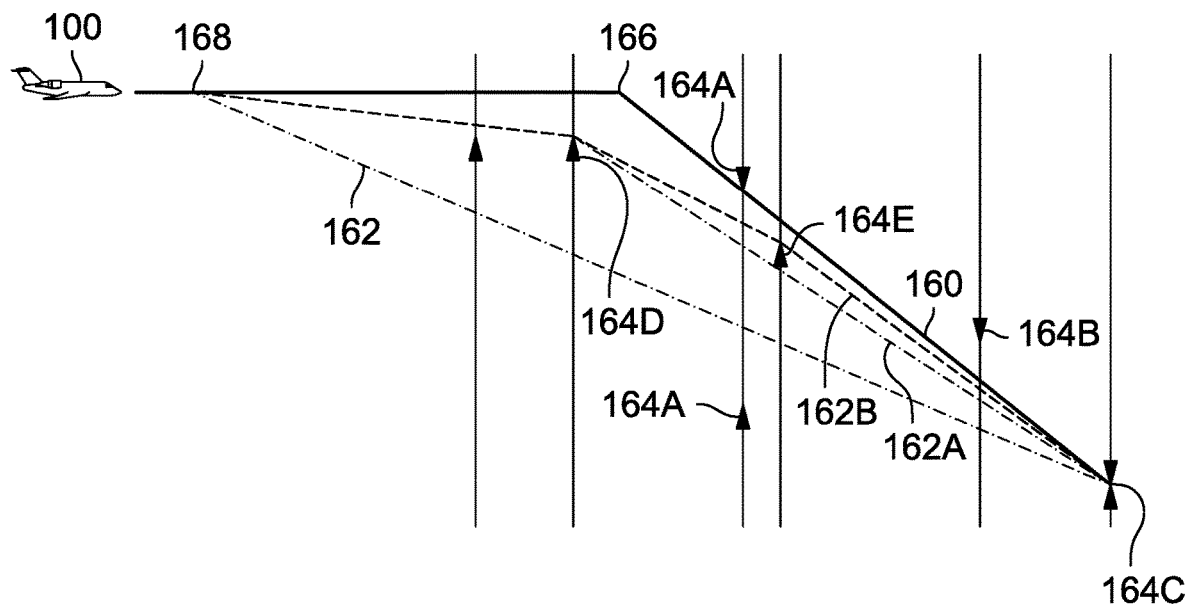
FIG. 6 is a schematic view illustrating another exemplary system for determining a modified path of descent for an automated avionics system, such as the automated avionics system illustrated in FIG. 1, in accordance with embodiments of the present disclosure.

Referring now to FIGS. 5 and 6, the processor 150 can determine a recalculated path of descent 162A that rejoins the original descent path 160 beyond the furthest reachable constraint without violating further downstream constraints. In some implementations, the processor 150 can calculate a vertical trajectory directly between the furthest reachable constraint (e.g., ABOVE constraint 164D) and the AT constraint 164C that does not violate any intermediate constraints (e.g., BETWEEN constraint 164A; as described with reference to FIG. 5). In other implementations, the processor 150 cannot calculate a vertical trajectory directly between the furthest reachable constraint (e.g., ABOVE constraint 164D) and the AT constraint 164C without violating an intermediate constraint (e.g., ABOVE constraint 164E). In these implementations, the processor 150 will calculate a vertical trajectory between the furthest reachable constraint (e.g., ABOVE constraint 164D) and the AT constraint 164C that complies with the intermediate constraint (e.g., ABOVE constraint 164E). In some implementations, the processor 150 treats the intermediate constraint as an AT constraint to optimize the recalculated path of descent 162B. For example, the processor 150 can calculate a vertical trajectory between the furthest reachable constraint (e.g., ABOVE constraint 164D) and the AT constraint 164C that passes the intermediate ABOVE constraint 164E at the maximum altitude associated with the intermediate ABOVE constraint 164E. Treating the intermediate constraint as an AT constraint reduces fluctuations in the flight path angle and/or slope of descent path.

Figure 7:
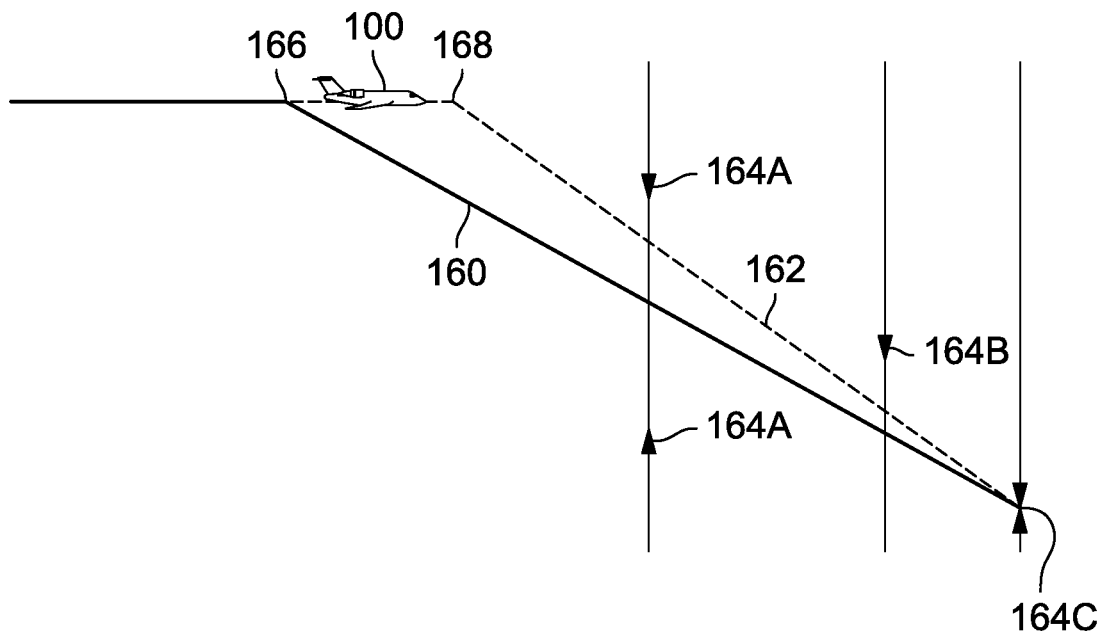
FIG. 7 is a schematic view illustrating another exemplary system for determining a modified path of descent for an automated avionics system, such as the automated avionics system illustrated in FIG. 1, in accordance with embodiments of the present disclosure.
Figure 8:
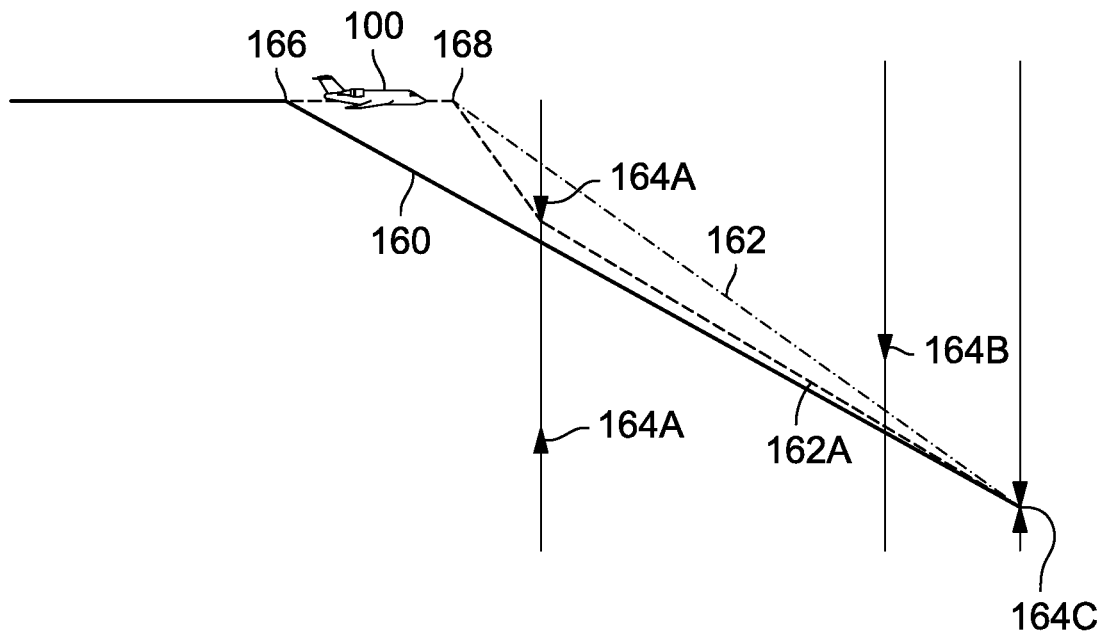
FIG. 8 is a schematic view illustrating another exemplary system for determining a modified path of descent for an automated avionics system, such as the automated avionics system illustrated in FIG. 1, in accordance with embodiments of the present disclosure.

Referring now to FIGS. 7 and 8, the processor 150 is operable to interface with the memory 152 to determine a modified path of descent 162 for the aircraft 100 based on a descent indication including a position of the aircraft 100 that is downstream from the original TOD 166 of the flight plan. In such implementations, the processor 150 determines a modified position of descent (e.g., modified TOD 168) based on the real-time position of the aircraft 100 and/or a downstream altitude position of the aircraft 100, the modified TOD 168 being downstream from the original TOD 166. The processor 150 then calculates a modified path of descent 162 including a vertical trajectory between the modified position of descent 168 and next downstream AT constraint 164C in the horizontal plane.

Utilizing techniques described above, the processor 150 is operable to recalculate the modified path of descent 162 so that the vertical trajectory based on the downstream modified TOD 168 complies with all downstream constraints. For example, the processor 150 determines a recalculated path of descent 162A by calculating a vertical trajectory between the modified TOD 168 and the BETWEEN constraint 164A. In such embodiments, the original descent path 160 is joined beyond the furthest reachable constraint. For example, the processor 150 can calculate a vertical trajectory between the furthest reachable constraint (e.g., BETWEEN constraint 164A) and the AT constraint 164C without violating the intermediate BELOW constraint 164B. In some implementations, the processor 150 treats the furthest reachable constraint as an AT constraint to optimize the recalculated path of descent 162A. For example, the processor 150 can calculate a vertical trajectory between the modified TOD 168 and the maximum altitude associated with the BETWEEN constraint 164A. By determining the recalculated path of descent 162A based on the furthest reachable constraint, the processor 150 provides a recalculated path of descent 162 that rejoins the original descent path 160 while minimizing fluctuations in flight path angle. Treating the furthest reachable constraint as an AT constraint further reduces fluctuations in the flight path angle and/or slope of descent path.

Figure 9:
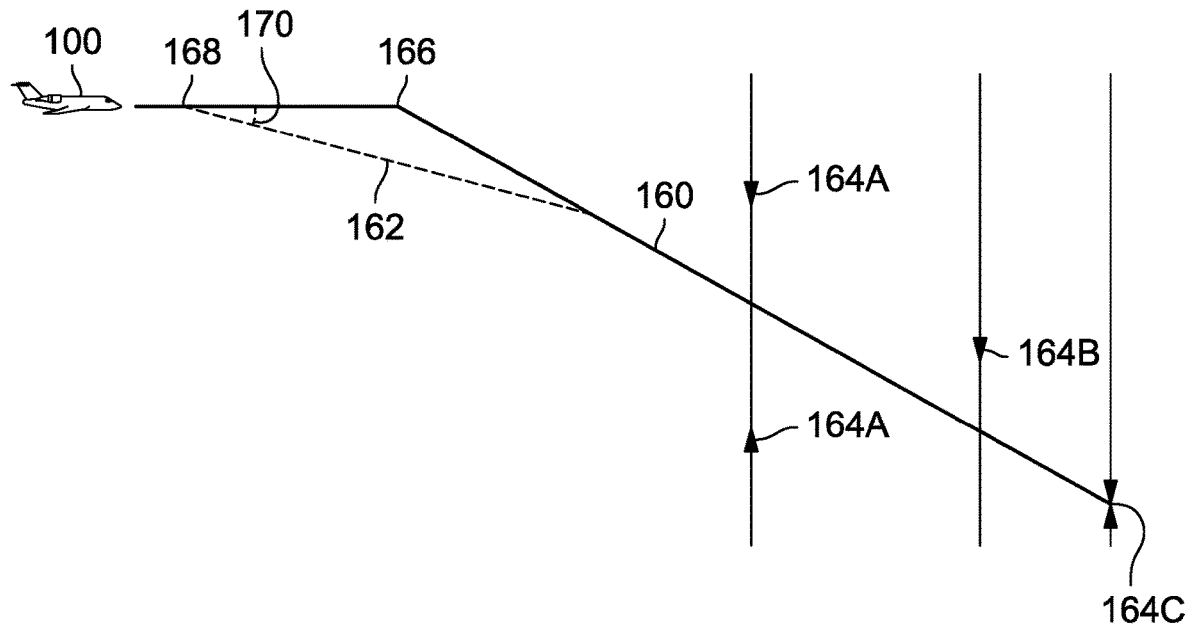
FIG. 9 is a schematic view illustrating another exemplary system for determining a modified path of descent for an automated avionics system, such as the automated avionics system illustrated in FIG. 1, in accordance with embodiments of the present disclosure.
Figure 10:
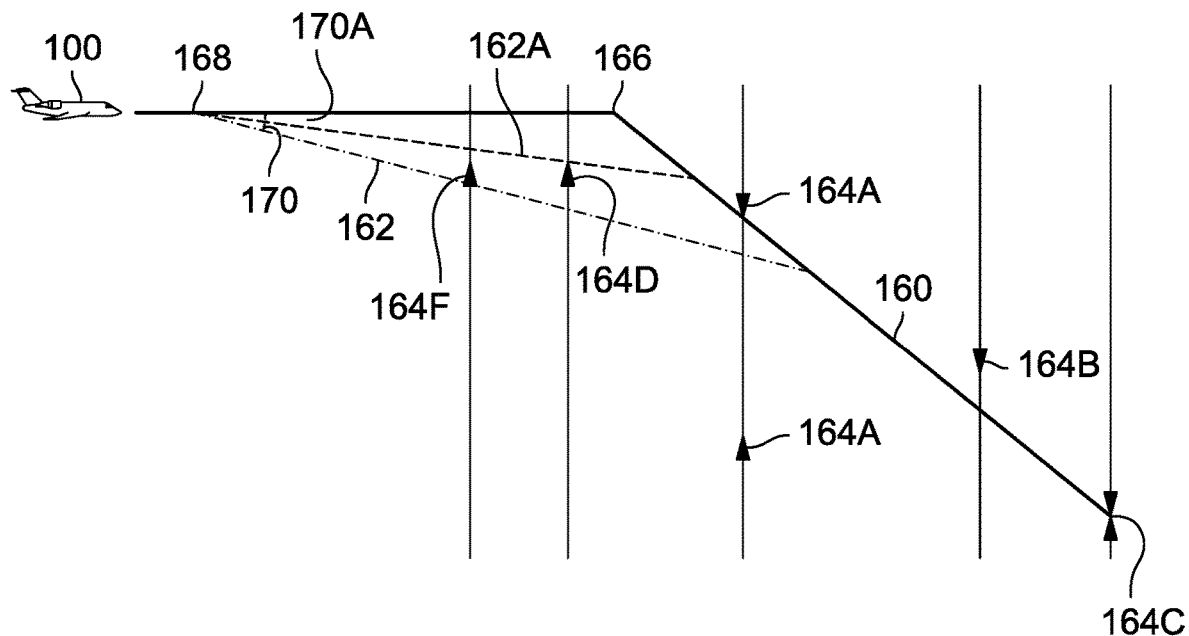
FIG. 10 is a schematic view illustrating another exemplary system for determining a modified path of descent for an automated avionics system, such as the automated avionics system illustrated in FIG. 1, in accordance with embodiments of the present disclosure.
Figure 11:
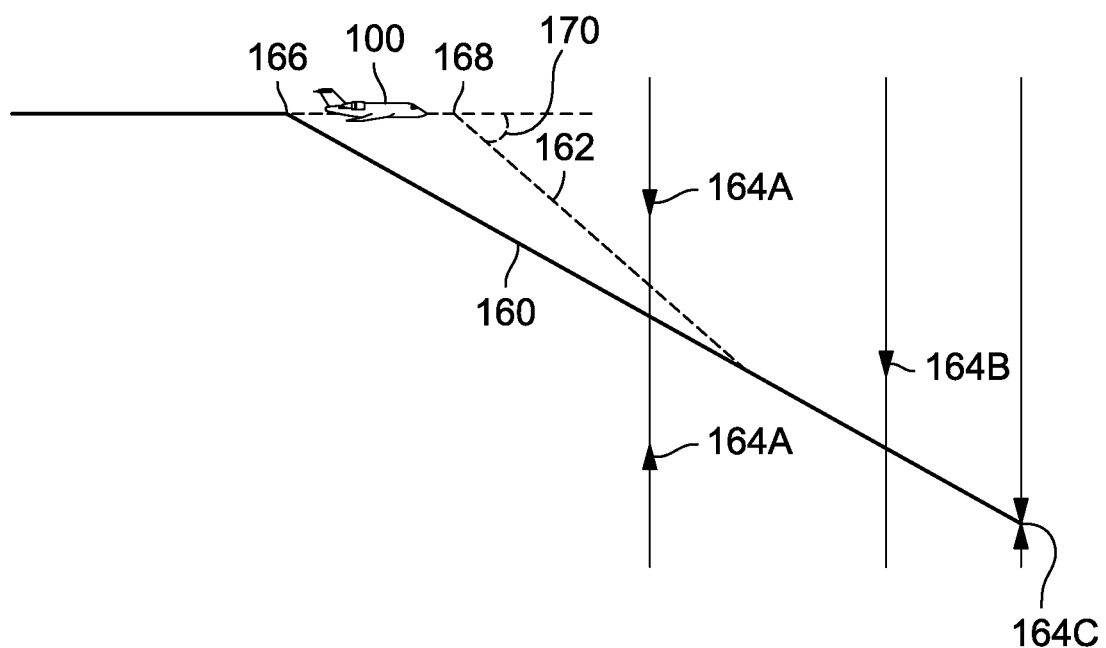
FIG. 11 is a schematic view illustrating another exemplary system for determining a modified path of descent for an automated avionics system, such as the automated avionics system illustrated in FIG. 1, in accordance with embodiments of the present disclosure.
Figure 12A:
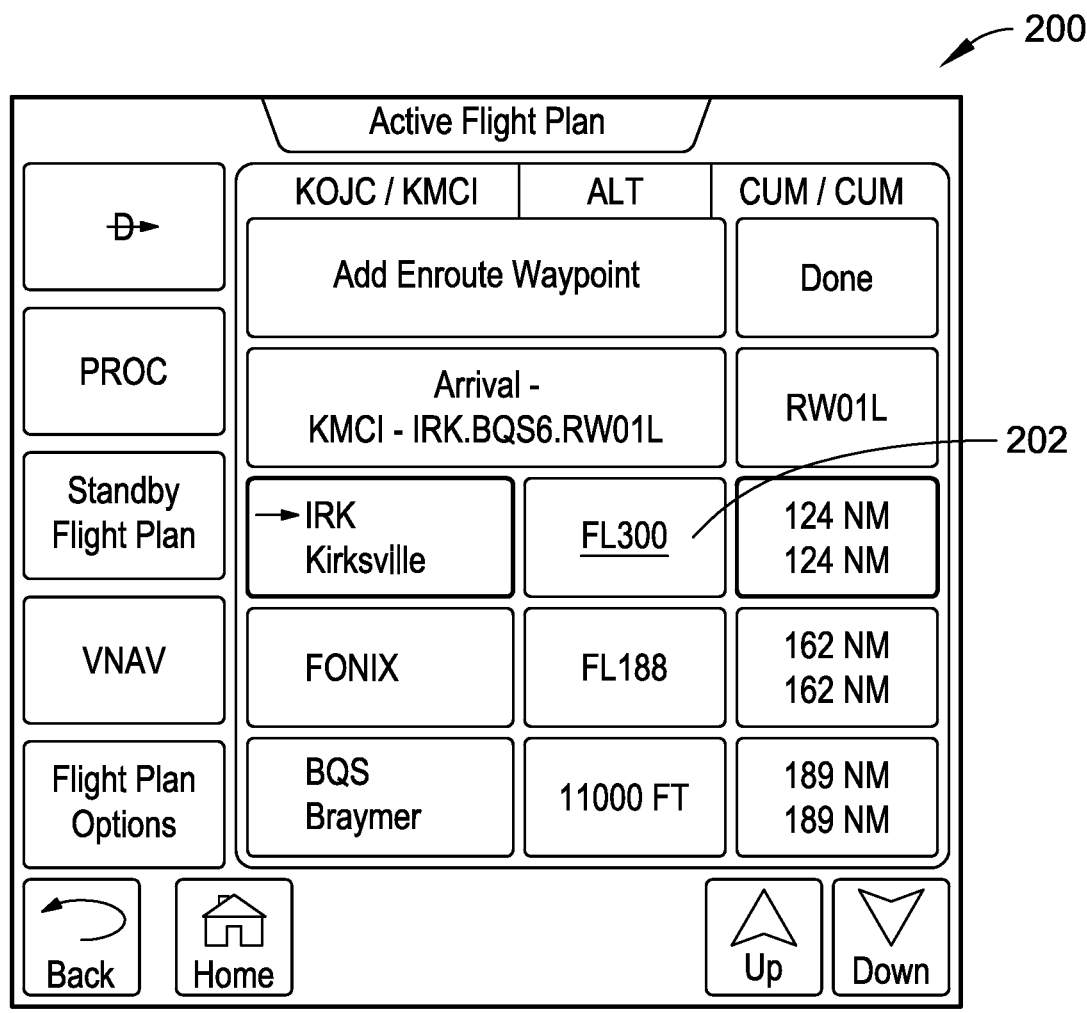
FIG. 12A is a screenshot illustrating a display for displaying on graphical interface of an automated avionics system, such as the automated avionics system illustrated in FIG. 1, in accordance with embodiments of the present disclosure.
Figure 12B:
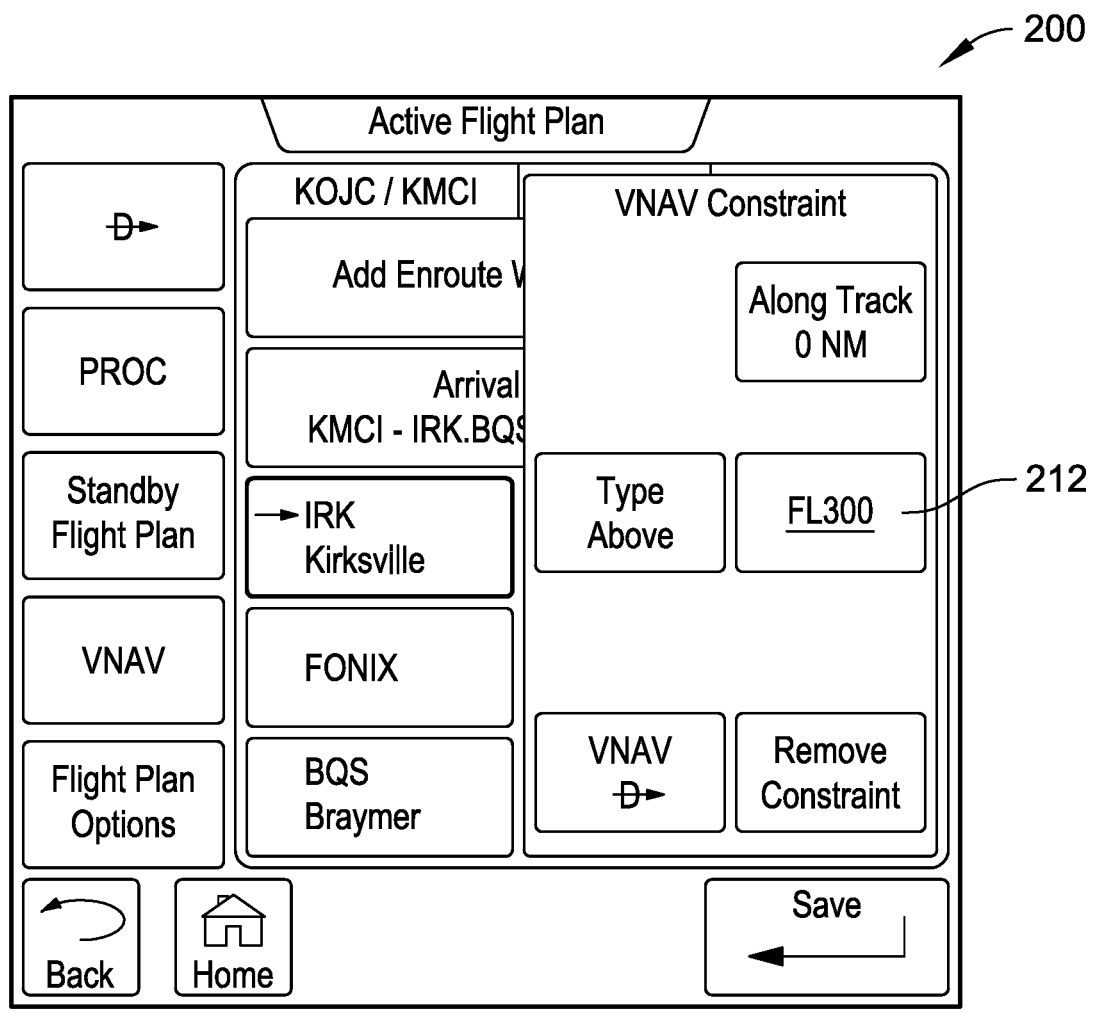
FIG. 12B is another screenshot illustrating a display for displaying on graphical interface of an automated avionics system, such as the automated avionics system illustrated in FIG. 1, in accordance with embodiments of the present disclosure.
Figure 13:
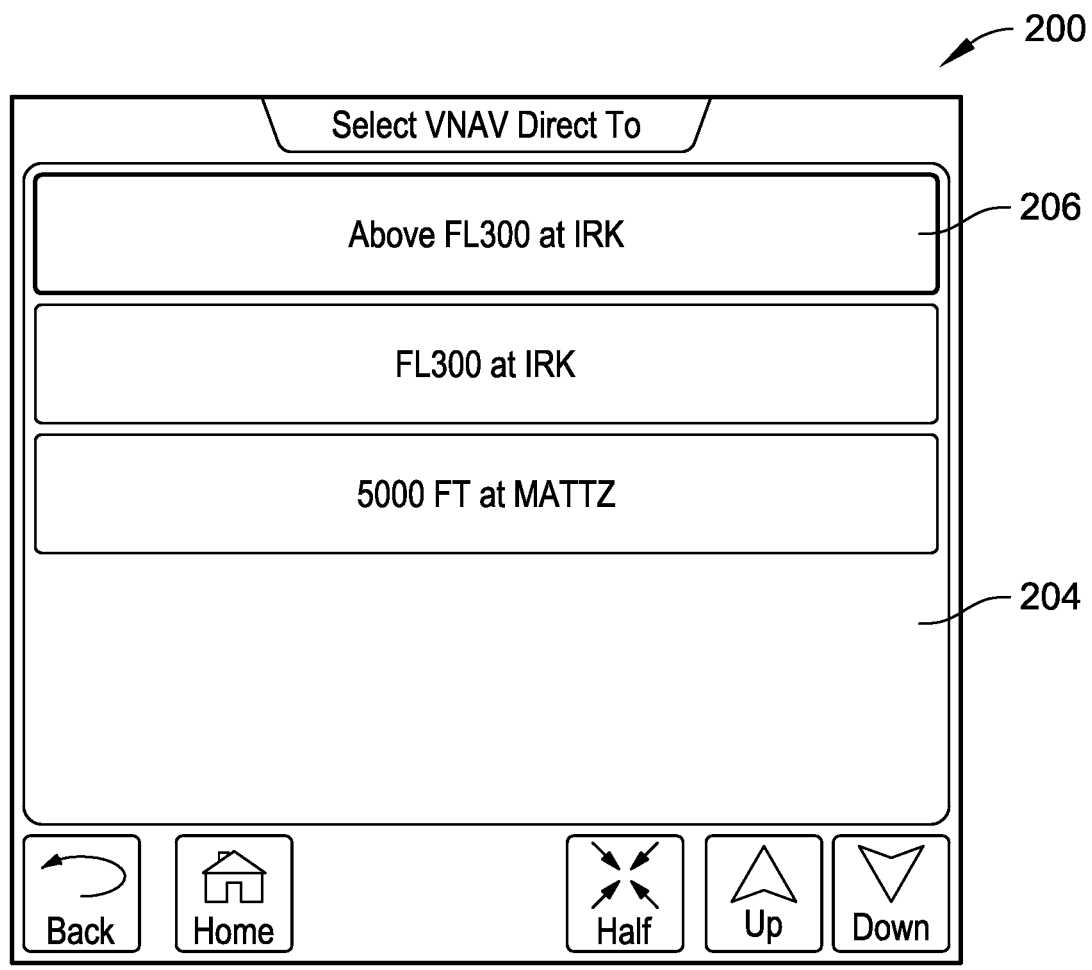
FIG. 13 is another screenshot illustrating another display for displaying on a graphical interface of an automated avionics system, such as the automated avionics system illustrated in FIG. 1, in accordance with embodiments of the present disclosure.
Figure 14A:
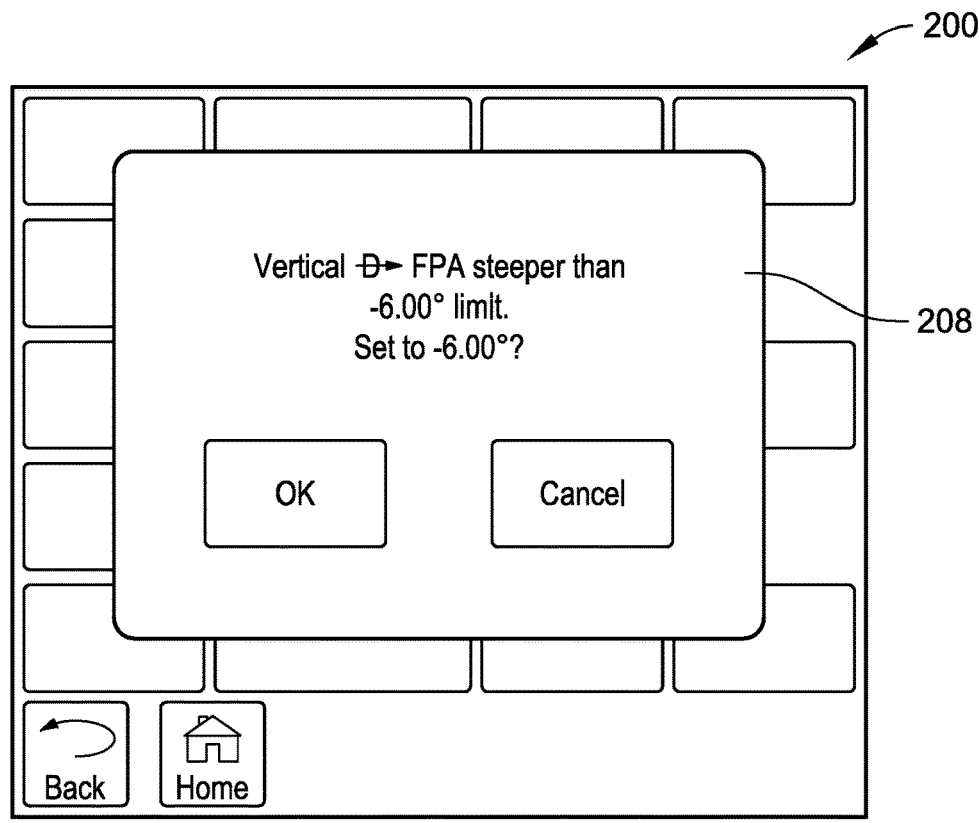
FIG. 14A is another screenshot illustrating another display for displaying on a graphical interface of an automated avionics system, such as the automated avionics system illustrated in FIG. 1, in accordance with embodiments of the present disclosure.
Figure 14B:
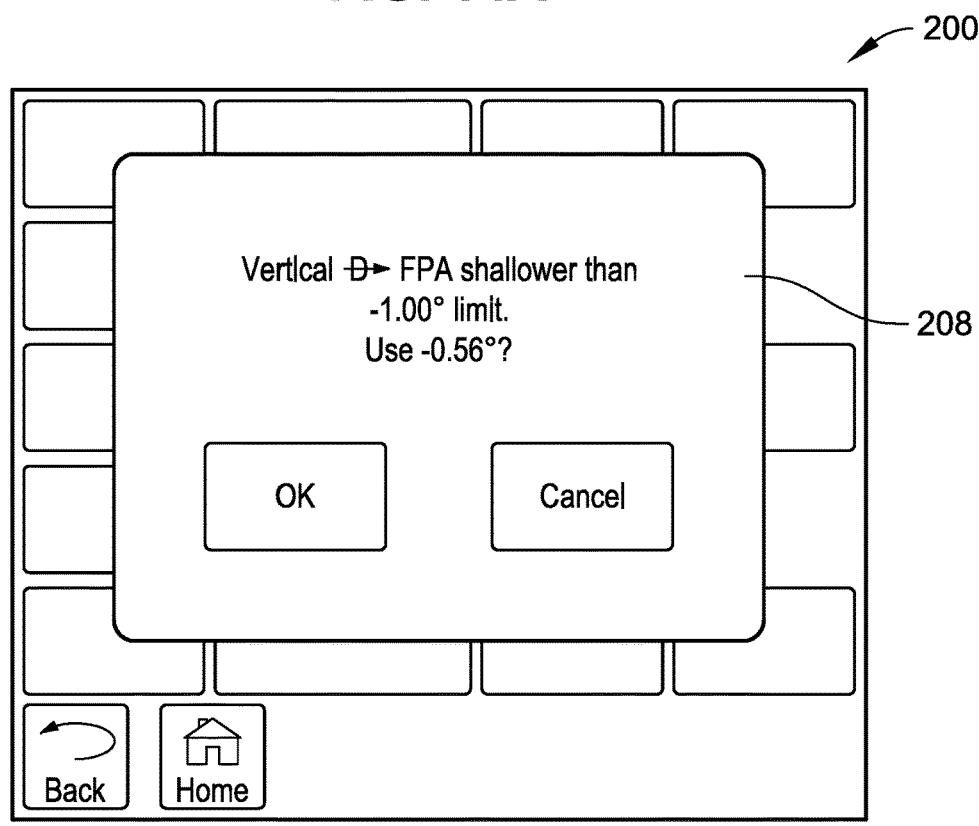
FIG. 14B is a screenshot illustrating another display for displaying on a graphical interface of an automated avionics system, such as the automated avionics system illustrated in FIG. 1, in accordance with embodiments of the present disclosure.
Figure 15:
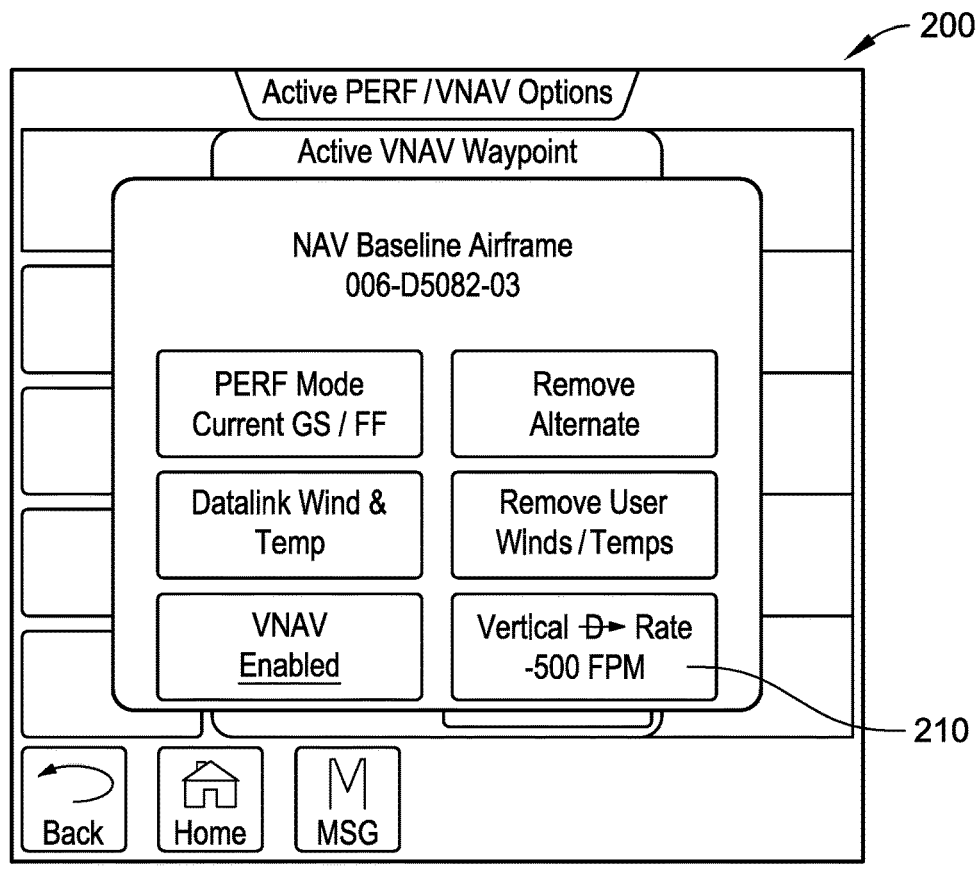
FIG. 15 is a screenshot illustrating another display for displaying on a graphical interface of an automated avionics system, such as the automated avionics system illustrated in FIG. 1, in accordance with embodiments of the present disclosure.
Figure 16:
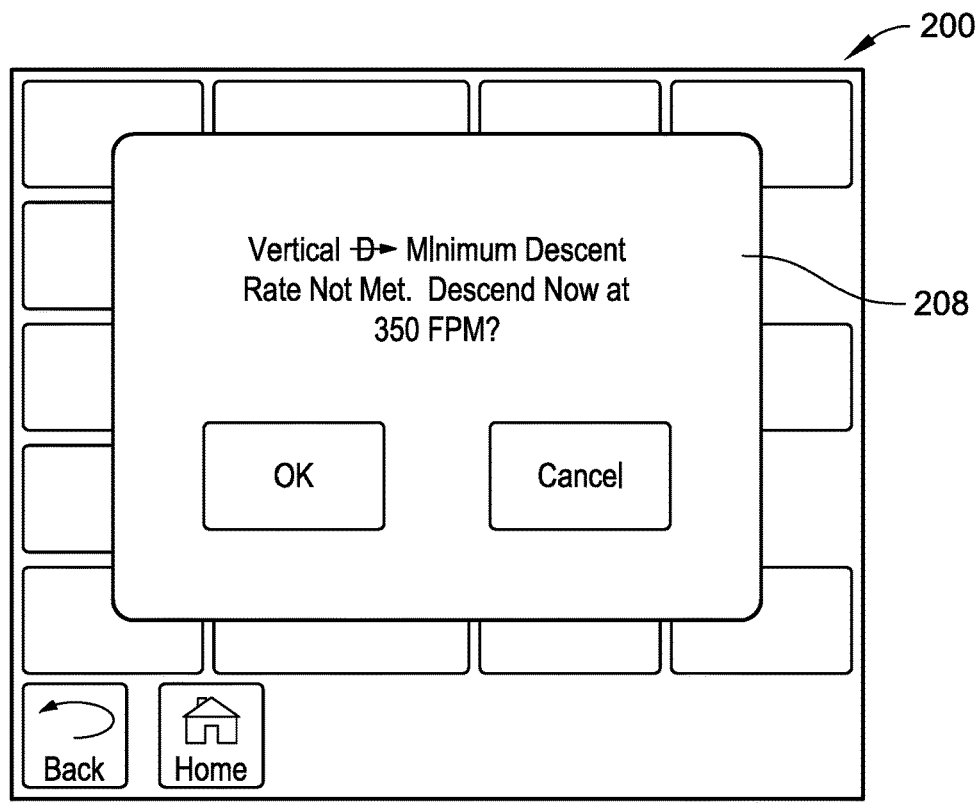
FIG. 16 is another screenshot illustrating another display for displaying on a graphical interface of an automated avionics system, such as the automated avionics system illustrated in FIG. 1, in accordance with embodiments of the present disclosure.

Referring now to FIGS. 9 through 11, the processor 150 is operable to interface with the memory 152 to determine a modified path of descent 162 for the aircraft 100 by executing a flight path algorithm based on one or more operator-selected or predefined characteristics (e.g., descent rate, flight path angle limit). In such implementations, the processor 150 determines a modified position of descent (e.g., modified TOD 168) based on the real-time position of the aircraft 100 and/or a downstream altitude position of the aircraft 100. The processor 150 then calculates a modified path of descent 162 including a vertical trajectory between the modified position of descent 168 and the original path of descent 160 based on the selected descent rate. For example, the processor 150 determines a flight path angle ("FPA") 170 for intercepting the original path of descent 160 using the following flight path algorithm:

$$FPA = -\tan^{-1}\left(\frac{desired\_fpm\_dscnt\_rate}{ground\_speed}\right)$$

The processor 150 then determines if the modified path of descent 162 violates any constraints (e.g., BETWEEN constraint 164A, BELOW constraint 164B) of the flight plan. Where no constraints are violated, the calculated flight path angle 170 required for the selected descent rate is maintained until the modified path of descent 162 intercepts the original path of descent 160 (e.g., as described with reference to FIG. 9).

In some implementations, the modified path of descent 162 based on the calculated flight path angle 170 and the selected descent rate may violate one or more constraints of the flight plan (e.g., as described with reference to FIG. 10). In such implementations, the processor 150 is operable to recalculate the modified path of descent 162 so that the vertical trajectory complies with all downstream constraints. In some implementations, the processor 150 determines a recalculated path of descent 162A by determining a vertical trajectory between the modified TOD 168 and the furthest limiting ABOVE constraint before the original path of descent 160 is intercepted (e.g., as described with reference to FIG. 10). For example, the processor 150 can calculate a vertical trajectory between the modified TOD 168 and the ABOVE constraint 164D without violating the intermediate ABOVE constraint 164F. In such embodiments, the processor 150 can determine a descent rate that differs from the selected descent rate, for example to avoid level-off at the ABOVE constraint 164D. For example, the actual descent rate may be slower or faster than the selected descent. In some embodiments, the processor 150 determines the steepest descent rate and corresponding FPA 170A that complies with the constraints of the flight plan.

For example, the processor 150 can calculate a vertical trajectory between the furthest reachable constraint (e.g., BETWEEN constraint 164A) and the AT constraint 164C without violating the intermediate BELOW constraint 164B. In some implementations, the processor 150 treats the furthest reachable constraint as an AT constraint to optimize the recalculated path of descent 162A. For example, the processor 150 can calculate a vertical trajectory between the modified TOD 168 and the maximum altitude associated with the BETWEEN constraint 164A. By determining the recalculated path of descent 162A based on the furthest reachable constraint, the processor 150 provides a recalculated path of descent 162A that rejoins the original descent path 160 while minimizing fluctuations in flight path angle. Treating the furthest reachable constraint as an AT constraint further reduces fluctuations in the flight path angle and/or slope of descent path.

In some embodiments, the processor 150 is operable to interface with the memory 152 to provide an indication to the pilot to cause the aircraft to initiate the modified path of descent 162 (or the recalculated path of descent 162A). For example, the processor 150 may display, via the display device 112, a prompt requiring the pilot to accept or decline initiation of the modified path of descent 162. The pilot can then engage one or more components and/or systems of the aircraft that are internal and/or external to the system 102 for initiating or traversing the modified path of descent 162, as described below. In some embodiments, the processor 150 is operable to interface with the memory 152 to elicit operator confirmation of a modified path of descent 162 for the aircraft 100 that violates an operator-selected and/or predefined characteristic, as described below. If the operator terminates the modified path of descent 162, the processor 150 may be operable to adjust the modified path of descent 162 to comply with the operator-selected and/or predefined characteristics.

In one or more embodiments, the processor 150 is operable to engage one or more control systems of the aircraft 100 to initiate the modified path of descent 162 (or recalculated path of descent 162A). In some implementations, the processor 150 can cause the flight director, autopilot system, and/or navigation system to actuate one or more modes of operation. For example, the processor 150 can cause the autopilot system to actuate the vertical navigation mode (VNAV) to traverse the vertical trajectory. The processor 150 can also cause the autopilot system to actuate a flight level change (FLC) mode and/or an altitude hold mode (ALT) to achieve and/or maintain desired airspeed and/or altitude while traversing the vertical trajectory.

The processor 150 is further operable to engage one or more components and/or systems of the aircraft that are internal and/or external to the system 102 for initiating or traversing the modified path of descent 162 (or recalculated path of descent 162A). In some embodiments, the processor 150 can actuate one or more systems and/or modes of operation of an aircraft engine. For example, the processor 150 can actuate the autothrottle system to control power of the engine. The autothrottle system can maintain predetermined speed and/or thrust during different phases of flight (e.g., cruise, descent, hold, near destination, approach, landing flare, inside the approach fix, etc.). For example, the autothrottle system can control the power of the engine to maintain the operator-selected descent rate.

FIGS. 12A through 16 illustrate example displays 200 furnishing flight information to the pilot and configured to receive input from the pilot and provide functionality for the pilot to engage with the graphic interface 104. For example, the display 200 can include information related to the flight plan including, but not limited to: a moving map, flight path angle, descent rate, navigation information, and so forth. In some embodiments, the processor 150 may cause the modified path of descent 162 and/or the recalculated path of descent 162A to be displayed to the pilot via one or the more display devices 112 and graphical interface 104 of the aircraft 100. For example, one or more of the moving maps, virtual situation displays, and/or synthetic vision technology displays of the graphical interface 104 may be updated to include the modified path of descent 162 and/or recalculated path of descent 162A.

In some embodiments, the display 200 can include one or more selectable items (buttons, selectable menus, etc.) for receiving input from the pilot. For example, the display 200 can include a selectable button 202 for initiating descent of the aircraft 100 (e.g., as described with reference to FIG. 12A). The pilot can select the button by touch input (e.g., via touch surface 116) to cause the processor 150 to engage the descent functionality described above (e.g., as described above with reference to FIGS. 3 through 11). In some embodiments, the processor 150 may populate the graphical interface 104 with additional selectable descent option(s) (e.g., selectable option button 212) based upon receiving a selection of selectable button 202 (e.g., as described with reference to FIG. 12B). In some embodiments, the display 200 can include a selectable menu 204 having a selectable menu option 206 (e.g., as described with reference to FIG. 13). The pilot can select the selectable menu option 206 (e.g., via touch surface 116) to cause the processor 150 to engage descent functionality described above. It is to be understood that the use of touch inputs (buttons, selectable menus, etc.) received via a touch surface is provided by way of example only. In other embodiments, pilot input can be received from other input devices (buttons, cursors, bezels, wheels, etc.) of the integrated avionics system 102.

In some embodiments, the display 200 is configured for receiving operator-selected characteristics related to the modified path of descent 162 (e.g., descent rate, flight path angle limit, etc.). For example, the display 200 can include a selectable button 210 for inputting a desired descent rate, minimum descent rate, or maximum descent rate (e.g., as described with reference to FIG. 15). In some embodiments, the display 200 is configured for receiving input from the operator to confirm or terminate the modified path of descent 162 based on operator-selected and/or predefined characteristics (e.g., descent rate, flight path angle limit, etc.). For example, when the modified path of descent 162 violates an operator-selected or predefined characteristic, a modal popup 208 can be displayed requiring the operator to approve or cancel initiation of the modified path of descent (e.g., as described with reference to FIGS. 14A, 14B, 16).

Example Processes

Figure 17A:
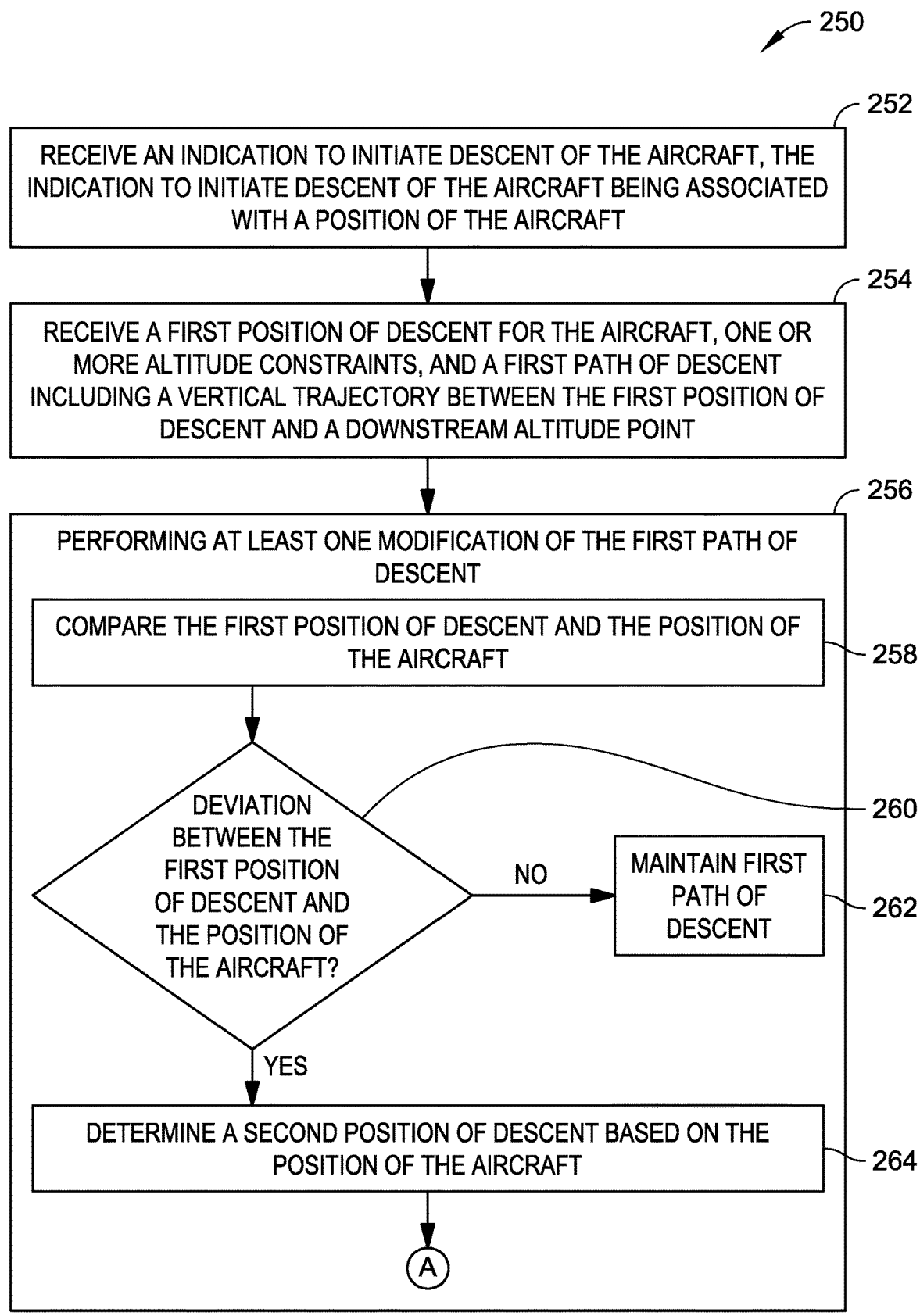
FIG. 17A is a flow diagram illustrating an example process for determining a modified path of descent for an aircraft in accordance with an example implementation of the present disclosure.
Figure 17B:
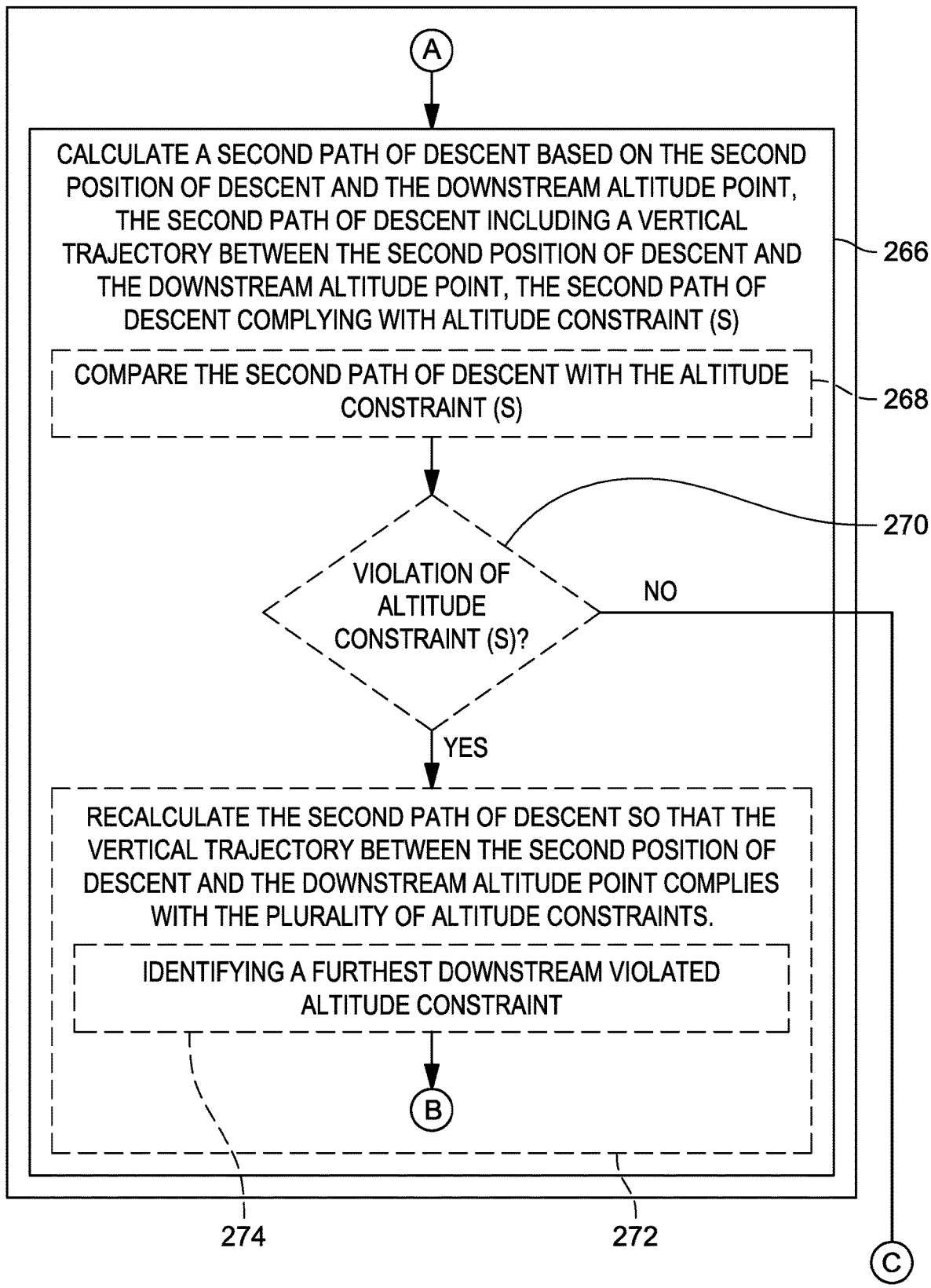
FIG. 17B is a flow diagram illustrating an example process for determining a modified path of descent for an aircraft in accordance with an example implementation of the present disclosure.
Figure 17C:
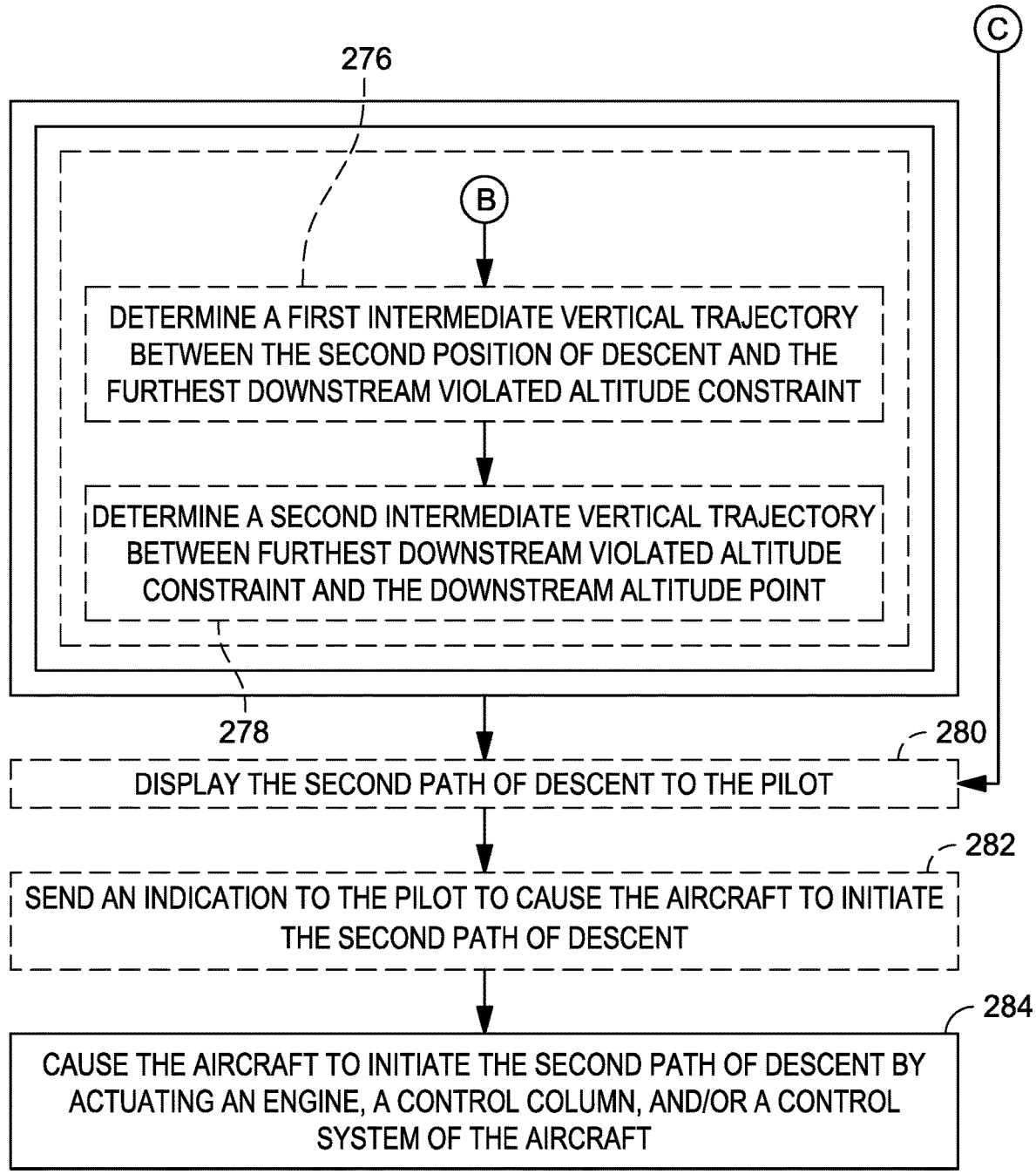
FIG. 17C is a flow diagram illustrating an example process for determining a modified path of descent for an aircraft in accordance with an example implementation of the present disclosure.

FIGS. 17A-17C depicts an example process 250 for initiating descent of an aircraft utilizing an automated avionics system, such the integrated avionics system 102 described above. As shown in FIG. 17A, an indication to initiate descent of the aircraft ("descent indication") is received, the descent indication being associated with a position of the aircraft (Block 252). In embodiments, the descent indication may include a real-time geographical and altitude position associated with the aircraft, for example, at a current position or a downstream position of the aircraft ("indicated position of descent").

Information associated with a flight plan for the aircraft is received, the information including a first position of descent for the aircraft (e.g., original TOD 166), one or more altitude constraints, and a first path of descent ("original path of descent") including a vertical trajectory between the first position of descent and a downstream altitude point (Block 254). As described above, the processor 150 is operable to receive flight plan information from a database of flight-related information associated with the flight plan stored in memory 152. In specific embodiments, the downstream altitude point is an AT constraint and/or a Final Approach Fix ("FAF").

At least one modification of the first path of descent is performed (Block 256). In embodiments, performing a modification of the first path of descent can include determining a new path of descent based on a modified TOD and/or performing one or more revisions of the first path of descent.

The original position of descent is compared to the position of the aircraft included in the descent indication (Block 258). A determination is made of whether there is a deviation between the original position of descent and the indicated position of descent (Decision Block 260). In some embodiments, the processor 150 can detect a deviation, greater than a predetermined deviation threshold, between the altitude of the aircraft in the indicated point in the horizontal plane and the altitude in this given point as provided by the original descent trajectory, as described above.

Where no deviation is detected between the original position of descent and the indicated position of descent, the original path of descent is maintained (Block 262). When a deviation is detected between the original position of descent and the indicated position of descent, a second position of descent (e.g., modified TOD 168) is determined based on the indicated position (Block 264). As described above, the modified TOD 168 may correspond directly to the indicated position, or may be downstream of the indicated position to provide an adequate transition between the level flight and descent phases.

A second path of descent ("modified path of descent") is calculated based on the second position of descent and the downstream altitude point (Block 266). The modified path of descent includes a vertical trajectory between the second position of descent and the downstream altitude point, and complies with the downstream altitude constraint(s) of the flight plan. As described above, the processor 150 then calculates a modified path of descent 162 including a vertical trajectory between the modified position of descent 168 and next downstream AT constraint 164C in the horizontal plane. In some implementations, calculating a second path of descent includes comparing the second path of descent with the altitude constraints of the flight plan (Block 268). A determination is made of whether any downstream altitude constraints of the flight plan are violated by the modified path of descent (Decision Block 270). Where no downstream altitude constraints are violated, the modified path of descent is initiated by actuating an engine, control column, or other control of the aircraft (Block 284).

Where one or more downstream altitude constraints are violated, the furthest reachable downstream violated altitude constraint is identified (Block 274). In some implementations, a first intermediate vertical trajectory is determined between the second position of descent and the furthest downstream violated altitude constraint (Block 276). In such implementations, a second intermediate vertical trajectory is determined between the furthest violated altitude constraint and the downstream altitude point (Block 278). As described above with reference to FIG. 4, the processor 150 can calculate a vertical trajectory between the modified TOD 168 and the BETWEEN constraint 164A without violating the intermediate ABOVE constraint 164D. In such embodiments, the original descent path 160 is joined beyond the furthest reachable constraint. For example, the processor 150 can calculate a vertical trajectory between the furthest reachable constraint (e.g., BETWEEN constraint 164A) and the AT constraint 164C without violating the intermediate BELOW constraint 164B. In some implementations, the furthest reachable constraint is treated as an AT constraint to optimize the modified path of descent. As described above with reference to FIG. 4, the processor 150 can calculate a vertical trajectory between the modified TOD 168 and the maximum altitude associated with the BETWEEN constraint 164A. By determining the recalculated path of descent 162A based on the furthest reachable constraint, the processor 150 provides a recalculated path of descent 162A that rejoins the original descent path 160 while minimizing fluctuations in flight path angle. Treating the furthest reachable constraint as an AT constraint further reduces fluctuations in the flight path angle and/or slope of descent path.

In some implementations, the modified path of descent is displayed to the pilot (Block 280). As described above, the processor 150 may cause the modified path of descent 162

(or recalculated path of descent 162A) to be displayed to the pilot via one or the more display devices 112 of the aircraft 100. For example, one or more of the moving maps of the graphical interface 104 may be updated to include the modified path of descent.

In some embodiments, an indication is sent to the pilot to cause the aircraft to initiate the modified path of descent 162 (or the recalculated path of descent 162A) (Block 282). For example, the processor 150 may display, via the display device 112, a prompt requiring the pilot to accept or decline initiation of the modified path of descent 162. In the event that the pilot declines initiation of the modified path of descent 162, the original path of descent is maintained.

The modified path of descent is initiated by actuating an engine, control column, or control system of the aircraft (Block 284). As described above, the processor 150 is operable to engage one or more control systems of the aircraft 100 to initiate the modified path of descent 162 (or recalculated path of descent 162A). In some implementations, the processor 150 can cause the flight director, autopilot system, and/or navigation system to actuate one or more modes of operation. For example, the processor 150 can cause the autopilot system to actuate the VNAV to traverse the vertical trajectory. The processor 150 can also cause the autopilot system to actuate a FLC mode and/or an ALT mode to achieve and/or maintain desired airspeed and/or altitude while traversing the vertical trajectory. In some embodiments, the processor 150 can actuate one or more systems and/or modes of operation of the aircraft engine. For example, the processor 150 can actuate the autothrottle system to control power of the engine and maintain an operator-selected descent rate.

It is to be understood that the terms "operator" and "pilot" are used interchangeably herein to describe any pilot, copilot, crew member, or other person who operates or controls the aircraft. It is to be further understood that the terms "operator" and "pilot" are also used interchangeably herein to describe any autonomous or semi-autonomous system that operates or controls the aircraft.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may include various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An automated avionics system for an aircraft comprising:
   a display device for providing a graphical interface for displaying flight-related information to a pilot;
   an interface device for receiving information from the pilot and allowing the pilot to interact with the graphical interface displayed on the display device;
   a memory operable to store a database related to a flight plan, the database including a first position of descent for the aircraft, a plurality of altitude constraints, and a first path of descent including a vertical trajectory between the first position of descent and a downstream altitude point; and
   a processor communicatively coupled with the interface device and operatively coupled with the display device and the memory, the processor configured to:
      receive, from the interface device, an indication to initiate descent of the aircraft, the indication to initiate descent of the aircraft being associated with a position of the aircraft;
      receive, from the database related to a flight plan, a first position of descent for the aircraft, a plurality of altitude constraints including the downstream altitude point, and a first path of descent including a vertical trajectory between the first position of descent and the downstream altitude point;
      perform at least one modification to the first path of descent, including:
         determine, based on a comparison of the first position of descent and the position of the aircraft, a deviation between the first position of descent and the position of the aircraft;
         determine, when the position of the aircraft deviates from the first position of descent, a second position of descent based on the position of the aircraft;
         calculate a second path of descent based on the second position of descent and the downstream altitude point, the second path of descent including a vertical trajectory between the second position of descent and the downstream altitude point;
         determine, by analyzing the plurality of altitude constraints, whether the second path of descent complies with the plurality of altitude constraints; and
         recalculate, when the second path of descent does not comply with one or more of the plurality of altitude constraints, the second path of descent so that the vertical trajectory between the second position of descent and the downstream altitude point complies with the plurality of altitude constraints, the recalculating including
            identifying a furthest downstream violated altitude constraint of the plurality of altitude constraints;

determining a first intermediate vertical trajectory between the second position of descent and the furthest downstream violated altitude constraint; and determining a second intermediate vertical trajectory between furthest downstream violated altitude constraint and the downstream altitude point;

cause the display device to display the recalculated second path of descent to the pilot on the interface device; and send an indication to the pilot to cause the aircraft to initiate the recalculated second path of descent.

2. The automated avionics system for an aircraft as recited in claim 1, wherein the downstream altitude point comprises an AT constraint at a predefined altitude.

3. The automated avionics system for an aircraft as recited in claim 1, wherein the second path of descent includes a flight path angle representing a non-zero slope between the second position of descent and the downstream altitude point.

4. The automated avionics system for an aircraft as recited in claim 3, wherein the processor, interfacing with the memory, is further operable to determine whether the flight path angle violates at least one predetermined flight path angle constraint.

5. The automated avionics system for an aircraft as recited in claim 1, wherein at least one of the second path of descent or the recalculated second path of descent is calculated based on a selected descent rate.

6. A method of operating an automated avionics system for an aircraft, the automated avionics system comprising a display device for providing a graphical interface for displaying flight-related information to a pilot, an interface device for receiving information from the pilot and allowing the pilot to interact with the graphical interface displayed on the display device, and a memory operable to store a database related to a flight plan of the aircraft, the method comprising:

receiving, from the interface device, an indication to initiate descent of the aircraft, the indication to initiate descent of the aircraft being associated with a position of the aircraft;

performing at least one modification of the first path of descent, including:

receiving, from the database related to a flight plan, a first position of descent for the aircraft, a plurality of altitude constraints, and a first path of descent including vertical trajectory between the first position of descent and a downstream altitude point;

determining, based on a comparison of the first position of descent and the position of the aircraft, a deviation between the first position of descent and the position of the aircraft;

determining, when the position of the aircraft deviates from the first position of descent, a second position of descent based on the position of the aircraft;

calculating a second path of descent based on the second position of descent and the downstream altitude point, the second path of descent including a vertical trajectory between the second position of descent and the downstream altitude point, the second path of descent complying with the plurality of altitude constraints;

determining, by analyzing the plurality of altitude constraints, whether the second path of descent complies with the plurality of altitude constraints; and recalculating, when the second path of descent does not comply with one or more of the plurality of altitude constraints, the second path of descent so that the vertical trajectory between the second position of descent and the downstream altitude point complies with the plurality of altitude constraints, wherein recalculating the second path of descent further includes:

identifying a furthest downstream violated altitude constraint of the plurality of attitude constraints;

determining a first intermediate vertical trajectory between the second position of descent and the furthest downstream violated altitude constraint; and determining a second intermediate vertical trajectory between furthest downstream violated altitude constraint and the downstream altitude point;

causing the display device to display the second path of descent to the pilot on the interface device; and sending an indication to the pilot to cause the aircraft to initiate the second path of descent.

7. The method as recited in claim 6, wherein the downstream altitude point comprises an AT constraint at a predefined altitude.

8. The method as recited in claim 6, wherein calculating a second path of descent further includes determining a flight path angle representing a non-zero slope between the second position of descent and the downstream altitude point.

9. The method as recited in claim 8, further comprising determining whether the flight path angle violates at least one predetermined flight path angle constraint.

10. The method as recited in claim 6, further comprising calculating the second path of descent based on a selected descent rate.

* * * * *